A. MacALLISTER.
FLY SCREEN.
APPLICATION FILED MAR. 23, 1914.

1,119,294.

Patented Dec. 1, 1914.

WITNESSES:

INVENTOR:
Alexander MacAllister
By ATTORNEY.

UNITED STATES PATENT OFFICE.

ALEXANDER MacALLISTER, OF BROWNSBURG, QUEBEC, CANADA.

FLY-SCREEN.

1,119,294. Specification of Letters Patent. Patented Dec. 1, 1914.

Application filed March 23, 1914. Serial No. 826,696.

*To all whom it may concern:*

Be it known that I, ALEXANDER MAC-ALLISTER, a subject of the King of Great Britain, residing at Brownsburg, in the county of Argenteuill, Province of Quebec, Dominion of Canada, have invented new and useful Improvements in Fly-Screens, of which the following is a specification.

My invention relates to an improvement in fly screens and has as its principal object the provision of improved means for maintaining a room free of flies.

A further object of my invention resides in the particular arrangement and combination of parts hereinafter described.

Figure 1:
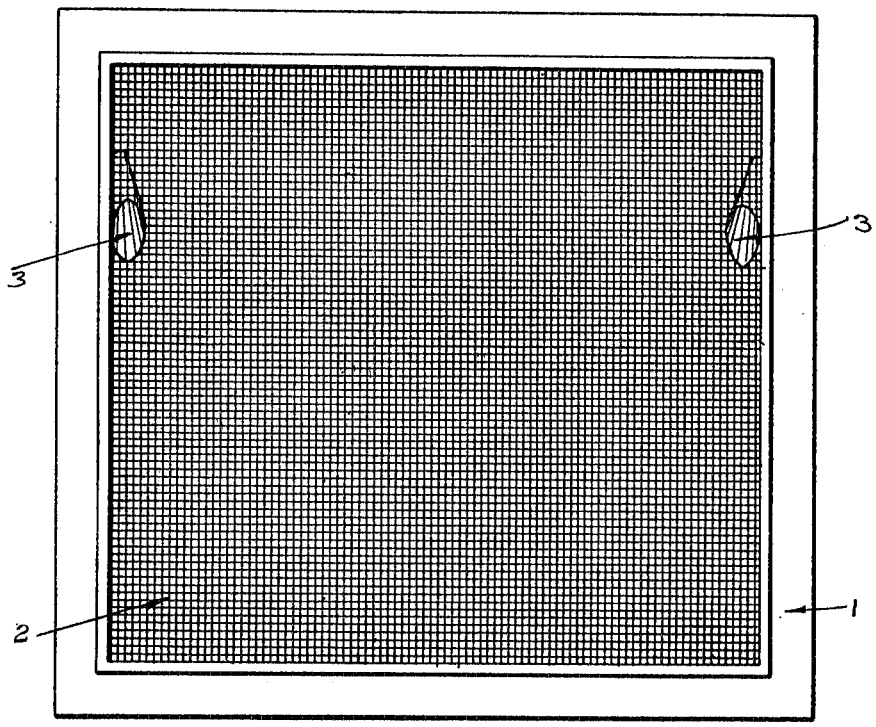
Figures 2, 3:
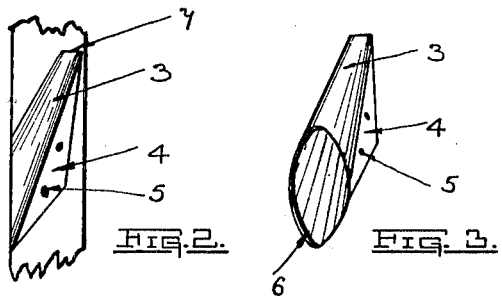

In the accompanying drawing:—Figure 1 is an elevational view of a window screen made according to my invention. Fig. 2 is a detail side elevation of the outlet tube used in connection with the screen shown in Fig. 1. Fig. 3 is an enlarged view of the tube shown in Fig. 2.

In the separate views the same part is designated by the same reference character.

Referring more particularly to the drawing, 1 is a rectangular frame such as is usually provided in making screens for windows to keep out the flies and other insects.

2 is a sheet of fine mesh material such as woven wire or other screening material adapted to permit air to pass in and out of the room but to prevent the entrance of insects. The material 2 may be attached to the frame 1 by nails, screws, or any other improved manner.

It is commonly the case that a number of flies will obtain access to a room in spite of all precautions. On the other hand, there are certain times during the day when insects are apt to pass out of the room to the out doors if there is a convenient exit. I have accordingly arranged my screen so that insects desiring to pass out may do so readily but have arranged the exit in such a manner that the insects will not return through the same passage from which they went out.

The exits just mentioned are provided for by means of one or more tubes 3—3 which are provided with flanges 4 at one side thereof by which they may be attached to the frame 1, the flanges 4 being provided with apertures such as 5 for the insertion of nails or screws. It will be seen that the tubes 3 taper upwardly the lower end being vertical and the other end horizontal. The large lower end is closely surrounded by the material 2 so as to prevent passage of insects alongside the tube, while the opening at the lower end is placed toward the room side of the screen and is sufficiently large to readily admit a fly. It will be seen, however, that the opening of the tube at the lower end is large in proportion to the space in the interior of the tube because the end is cut at an angle to the axis of the tube. Consequently when once fairly within the tube the fly cannot turn around and he will therefore almost inevitably pass out of the upper end. Once on the outside, however, he cannot return owing to the well-known disinclination of the insect to pass downwardly through an opening. Moreover, the apertures at the upper end is so small as to be uninviting. I have shown the large lower end of the tube 3 at numeral 6 and the horizontal small upper end of the tube is numbered 7.

It will be seen from the foregoing that I have provided a way in which a well screened room will tend to keep itself entirely clear of flies and other insects.

It will be understood that while I have shown and described the preferred form of my invention, I do not wish to be limited thereto except as to such limitations as are clearly expressed in the appended claim.

What I claim is:—

The combination with a screen and its complemental frame, of a tube disposed at either side of said frame, said tube consisting of a single sheet of metal rolled to form a tube having a tapered passage therethrough, one end lying within said passage and the other end forming a flange said flange being secured to the frame, substantially as described.

In testimony whereof I affix my signature in the presence of two witnesses.

ALEXANDER MacALLISTER.

Witnesses:
 ODILON BRISSON,
 JAMES GREEN.